(12) United States Patent
Skubic et al.

(10) Patent No.: US 7,245,602 B2
(45) Date of Patent: Jul. 17, 2007

(54) SYSTEM AND METHOD FOR ANONYMOUS BLUETOOTH DEVICES

(75) Inventors: Janez Skubic, Hässelby (SE); Paul Dent, Pittsboro, NC (US); Nils Rydbeck, Cary, NC (US); Christian Gehrman, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 852 days.

(21) Appl. No.: 09/802,095

(22) Filed: Mar. 7, 2001

(65) Prior Publication Data

US 2002/0131445 A1 Sep. 19, 2002

Related U.S. Application Data

(60) Provisional application No. 60/252,828, filed on Nov. 22, 2000.

(51) Int. Cl.
*H04Q 7/24* (2006.01)

(52) U.S. Cl. .................. 370/338; 370/328; 370/349

(58) Field of Classification Search ........ 370/310–350, 370/474
See application file for complete search history.

(56) References Cited

U.S. PATENT DOCUMENTS

| | | | |
|---|---|---|---|
| 5,758,282 A * | 5/1998 | Yamashina et al. ......... 455/428 |
| 5,872,513 A | 2/1999 | Fitzgibbon et al. ......... 340/539 |
| 5,995,842 A | 11/1999 | Jonsson ...................... 455/462 |
| 6,246,670 B1 * | 6/2001 | Karlsson et al. ............ 370/244 |
| 6,252,884 B1 * | 6/2001 | Hunter ....................... 370/443 |
| 6,452,920 B1 * | 9/2002 | Comstock ................... 370/349 |
| 6,496,503 B1 * | 12/2002 | Pelissier et al. ............ 370/389 |
| 6,587,882 B1 * | 7/2003 | Inoue et al. ................ 709/227 |
| 6,618,757 B1 * | 9/2003 | Babbitt et al. ............. 709/226 |
| 6,633,761 B1 * | 10/2003 | Singhal et al. ............. 455/436 |
| 6,735,202 B1 * | 5/2004 | Ahmed et al. ............. 370/392 |
| 6,778,528 B1 * | 8/2004 | Blair et al. ................. 370/352 |
| 7,099,304 B2 * | 8/2006 | Liu et al. .................... 370/352 |
| 2002/0004900 A1 | 1/2002 | Patel et al. |
| 2002/0059614 A1 * | 5/2002 | Lipsanen et al. ............. 725/75 |
| 2002/0090911 A1 | 7/2002 | Evans et al. |
| 2003/0191560 A1 * | 10/2003 | Yokoo et al. ............... 700/245 |

FOREIGN PATENT DOCUMENTS

| | | |
|---|---|---|
| EP | 0 982 958 A2 | 3/2000 |
| EP | 0 982 958 A3 | 1/2001 |
| GB | 2259 172 A | 3/1993 |
| WO | WO 01/06799 | 1/2001 |
| WO | EP 01/13435 | 10/2002 |

* cited by examiner

*Primary Examiner*—Ricky Q. Ngo
*Assistant Examiner*—Jason Mattis

(57) ABSTRACT

A method and apparatus for enabling anonymous communications from a first Bluetooth device to a second Bluetooth device is disclosed wherein a temporary identification number associated with the first Bluetooth device is obtained and used in transmissions from the first Bluetooth device to the second Bluetooth device. A temporary identification number provides no clear indication of the particular Bluetooth communications device transmitting messages.

7 Claims, 6 Drawing Sheets

SYSTEM AND METHOD FOR ANONYMOUS BLUETOOTH DEVICES

RELATED APPLICATIONS

This application claims priority from and incorporates herein by reference the entire disclosure of U.S. Provisional Application Ser. No. 60/252,828, filed Nov. 22, 2000.

TECHNICAL FIELD

The present invention relates to Bluetooth devices, and more particularly, to the enablement of anonymous communications between devices using the Bluetooth communications protocol.

BACKGROUND OF THE INVENTION

The Bluetooth communications protocol (Bluetooth is a trademark of Telefonaktiebolaget LM Ericsson) is a wireless radio short range communications protocol enabling devices such as mobile telephones, computers and other electronic devices to communicate with each other over short ranges. When communicating using this protocol, a Bluetooth radio unit transmits over the wireless link a unique identity number that enables other devices to identify and address the Bluetooth radio unit. While use of the unique identity number is necessary for operation of units using the Bluetooth communications protocol, this requirement represents a threat to the security and privacy of people that carry a Bluetooth device.

This is due to the fact that the presence of a Bluetooth device can be established through identification of its unique identity number. If someone can register the presence of a specific Bluetooth unit and has also been able to identify a particular individual using this device, this person may identify through the presence of the Bluetooth device that the specific person is present within a particular location. In some circumstances this type of identification procedure may be highly undesirable. Thus, the need has arisen for some method of interaction among Bluetooth devices that does not necessarily provide the identity of the Bluetooth device, and hence the individual using the device is not made readily available.

SUMMARY OF THE INVENTION

The present invention overcomes the foregoing and other problems with a system and method enabling anonymous communications to take place between a first Bluetooth communications device and a second Bluetooth communications device. In a first embodiment, a first Bluetooth communications device generates a temporary identification number which is inserted within transmissions from the first Bluetooth communications device to the second Bluetooth communications device. Other embodiments have the first Bluetooth communications device utilizing randomly generated identification numbers in order to first establish communications with the second Bluetooth communications device and then receiving a temporary identification number from the second Bluetooth device to support communication.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
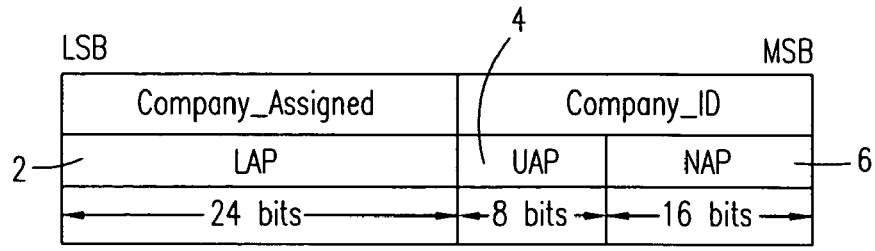
FIG. 1 illustrates the format of a Bluetooth address.

Referring now to the drawings, and more particularly to FIG. 1, where there is illustrated an example of a Bluetooth device address (BD_addr) according to the present format utilized within the Bluetooth communications protocol. A Bluetooth device address has a length of 48 bits. The LAP (lower address part) 2 and the UAP (upper address part) 4 form the significant portion of the BD_addr and is completed by the NAP (non-significant address part) 6. The LAP consists of 24 bits, the UAP consists of 8 bits, and the NAP consists of 16 bits to provide the 48 bit address.

The Bluetooth access code comprises the first part of each packet transmitted within the Bluetooth protocol. Some of the access codes used in Bluetooth are uniquely determined by the LAP in the Bluetooth device address. There are four different types of access codes. The Channel Access Code (CAC) is derived from the Master's LAP 2. The Device Access Code (DAC) is derived from the Slave's LAP 2. The Inquiry Access Code (IAC) can be of two different forms but is derived from the special dedicated LAP values not related to any specific BD_addr.

Thus, the CAC and DAC can be used to track the location of a specific user. Furthermore, the entire Bluetooth address is sent in a special frequency hop synchronization (FHS) packet used on certain occasions. The frequency hopping scheme in Bluetooth is determined by a hopping sequence. The hopping sequence calculation uses different input parameters. For the connection state, the LAP and the at least four most significant bits in the UAP of the master device are used. For the page state, the LAP/UAP of the paged unit is used. This makes it theoretically possible to obtain information on the LAP and the four most significant bits of the UAP based on the observed hopping scheme. Significant bits of the master device address in a connection may thus be revealed.

Figure 2:
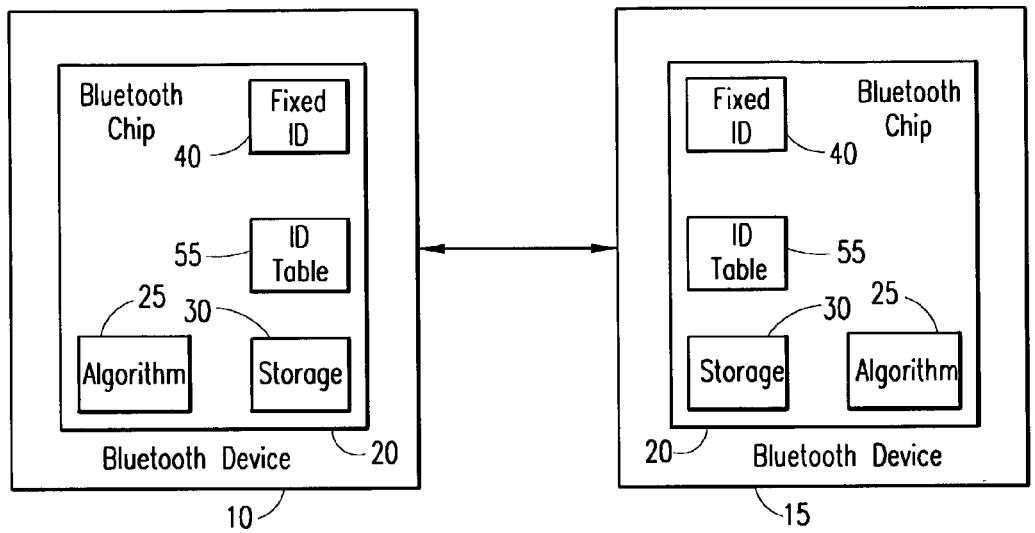
FIG. 2 is a block diagram illustrating Bluetooth devices capable of anonymously communicating with each other.

Referring now to FIG. 2, there is illustrated a functional block diagram of a system providing anonymous Bluetooth communications between a first Bluetooth device 10 and a second Bluetooth device 15. Each of the Bluetooth devices include a Bluetooth chip 20 thereon for enabling Bluetooth communications between the first Bluetooth device 10 and the second Bluetooth device 15. A number of structures and/or algorithms may be implemented within each of the Bluetooth chips 20 in order to provide the anonymous Bluetooth connection functionality of the present invention. However, it should be realized that only some of these algorithms and/or structures are necessary for implementing the various embodiments described in FIGS. 2-11, and it is not necessary for each of the structures or algorithms to be present. Furthermore, the described algorithms and structures may be implemented outside of the Bluetooth chip 20, if desired.

Each Bluetooth chip 20 includes an algorithm 25 enabling the generation of a temporary identification number for a Bluetooth device 10, 15 each time the device sends out messages or responses including the identity number of the Bluetooth device. The algorithm 25 for generating a temporary identification number may be built into the Bluetooth chip 20 of a Bluetooth device 10, 15, downloaded into the Bluetooth device 10, 15 or user selected. The particular algorithm 25 is not important for the process except to the extent of the security and privacy level provided by the algorithm. The algorithm 25 must generate a Bluetooth identification number which complies with existing and/or future identification number formats.

The Bluetooth chip 20 may additionally include a storage area 30 for temporarily storing a temporary identification number generated by the algorithm 25. Furthermore, an identification table 55 may be utilized wherein temporary identifiers for other Bluetooth devices 15 with which a Bluetooth device 10 is presently communicating may be stored. Finally, a normal fixed identification number 40 is stored or associated somewhere with the Bluetooth chip 20 to be available for operations necessarily requiring the fixed identification number.

Figure 3:
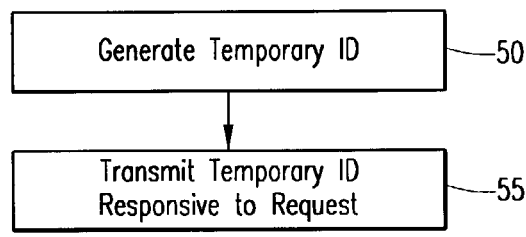
FIG. 3 illustrates a first embodiment of a method for the anonymous communication between Bluetooth devices.

As described previously with respect to the algorithm 25 of FIG. 2, a number of algorithms may implement various methods for providing anonymous Bluetooth communications between a first Bluetooth device 10 and a second Bluetooth device 15. A variety of these methods are described with respect to FIGS. 3-15. Referring now to FIG. 3, there is illustrated one embodiment wherein a Bluetooth device generates a temporary identification number at step 50. The generation of the temporary identification number at step 50 may be done on a periodically recurring basis, at random time intervals or in response to each transaction between the first Bluetooth device 10 and the second Bluetooth device 15. The Bluetooth device 10 transmits using the temporary identification number at step 55 responsive to a received request for inquiry from a second Bluetooth device 15. The temporary identification number can be stored within the temporary storage area 30 mentioned previously with respect to FIG. 2. The temporary identification number may also be changed during a transaction period. In this case, the Bluetooth devices will exchange the new identification number or instructions on how to generate a temporary identification number based upon knowledge of the existing identification number.

Figure 4:
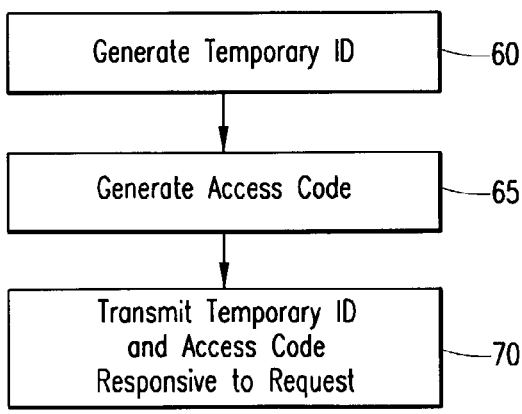
FIG. 4 illustrates an alternative embodiment of a method for communicating anonymously between Bluetooth devices.

Referring now to FIG. 4, there is illustrated an alternative embodiment wherein an access code is provided along with the temporary identification number responsive to a request between a first Bluetooth unit 10 and a second Bluetooth unit 15. As in the previous embodiment, the first Bluetooth device 10 generates at step 60 a temporary identification number for the first Bluetooth device 10. The first Bluetooth device 10 also generates at step 65 an access code including information about the format and category of the temporary identity number. Access codes currently defined in the Bluetooth specification may be used. The access codes provide for the possibility wherein another node can handle alternative ID formats. The node can generate alternative ID formats that may not fully comply to the standard specification using the access code. Responsive to an inquiry or request, the first Bluetooth device 10 transmits at step 70 the temporary identification number and the access code to a second Bluetooth device 15. The advantage of this method is that it prepares for the possibility that the second Bluetooth device 10 handles alternative identification number formats that may not comply fully to a standard specification. This capability may not be desirable because it reduces general interoperability between units, but could be desirable in certain applications having high privacy requirements. The access codes currently defined within the Bluetooth specification (Bluetooth Special Interest Group, Specification of the Bluetooth System Version 1.0B, Volumes 1 and 2, which is incorporated herein by reference) can be used for this purpose.

Figure 5:
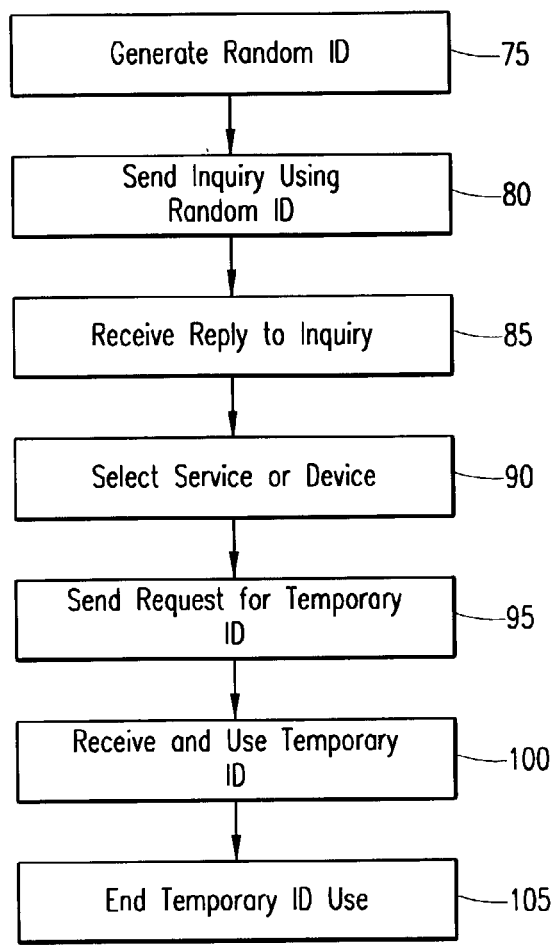
FIG. 5 illustrates yet a further embodiment of a method for communicating anonymously between Bluetooth devices.

Referring now to FIG. 5, there is illustrated yet another alternative embodiment of the method of the present invention. In this embodiment, the first Bluetooth device 10 initially generates at step 75 a random identification number. An inquiry for a particular service or class of device is transmitted from the first Bluetooth device 10 at step 80. The first Bluetooth device 10 receives at step 85 a number of replies to its inquiry. The first Bluetooth device 10 selects at step 90 the desired service or device responsive to the received inquiries and establishes a connection with a selected unit using the generated random identification number as the Bluetooth identifier number. Upon the selection of the service or device, the first Bluetooth device 10 transmits a request for a temporary identification number at step 95 to the second Bluetooth device 15 from which it is requesting a service or device. The request still uses the random identification number as the Bluetooth identifier number. The first Bluetooth device 10 receives and uses a provided temporary identification number at step 100 for the length of a transaction between the first Bluetooth device 10 and the second Bluetooth device 15. At some point during or after the transaction, the first Bluetooth device 10 may end use of the temporary identification number at step 105. This may be in response by the first Bluetooth device 10 to leaving the area or expiration of the temporary identification number after a predetermined period of time. If the temporary identification number expires during a transaction, a new temporary identification number may be obtained by repeating steps 75 through 100.

Figure 6:
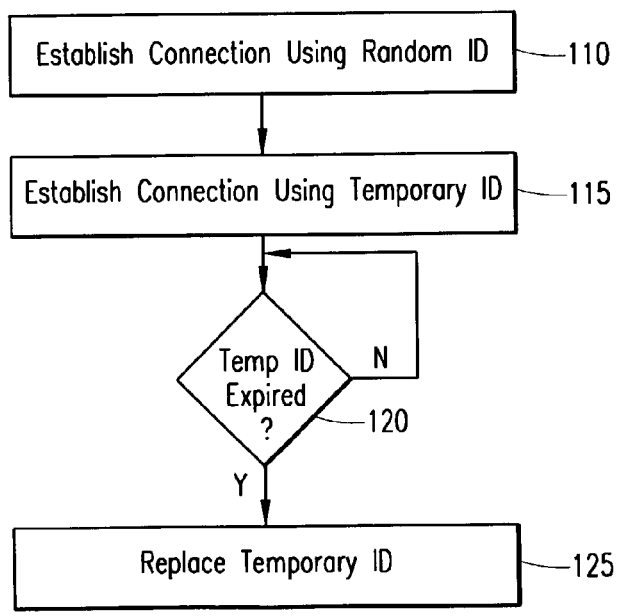
FIG. 6 illustrates yet a further embodiment of a method for communicating anonymously between Bluetooth devices.
Figure 7:
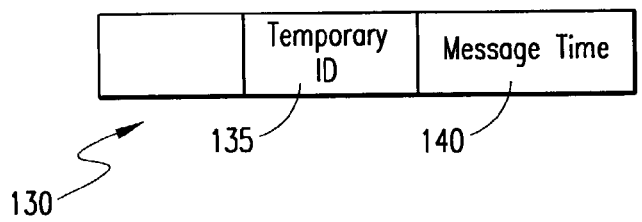
FIG. 7 illustrates a message transmitted between Bluetooth devices using the method of FIG. 5.

Referring now to FIG. 6, there is illustrated yet another embodiment wherein the first Bluetooth device 10 first establishes at step 110 a connection using a randomly selected identification number as the Bluetooth identifier number. Use of the random identification number enables establishment at step 115 of a connection using a temporary identification number as the Bluetooth identifier number as described previously with respect to FIG. 5. Inquiry step 120 monitors for expiration of the temporary identification number established at step 115 and upon expiration of the temporary identification number, the temporary identification number is replaced at step 125. As shown in FIG. 7, the period of time a temporary identification number may be active can be established in a message 130 transmitted from a second Bluetooth device 15 to a first Bluetooth device 10 response to a request from the first Bluetooth device 10. Included within the message 130 would be the temporary identification number 135 and a message time 140 indicating the length of time the temporary identification number 135 is active.

Figure 8:
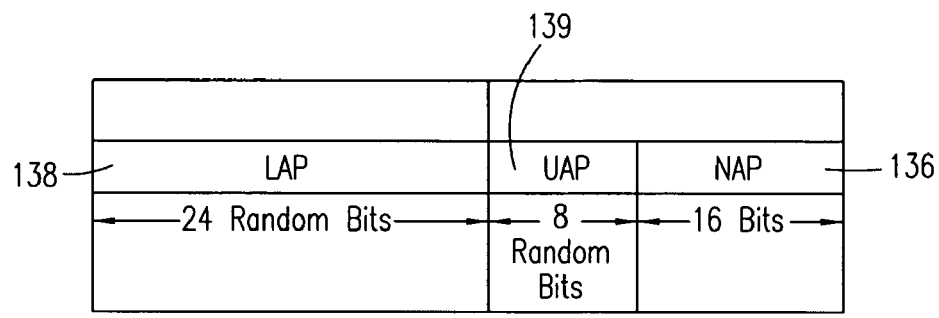
FIG. 8 illustrates a randomly generated Bluetooth address.
Figure 9:
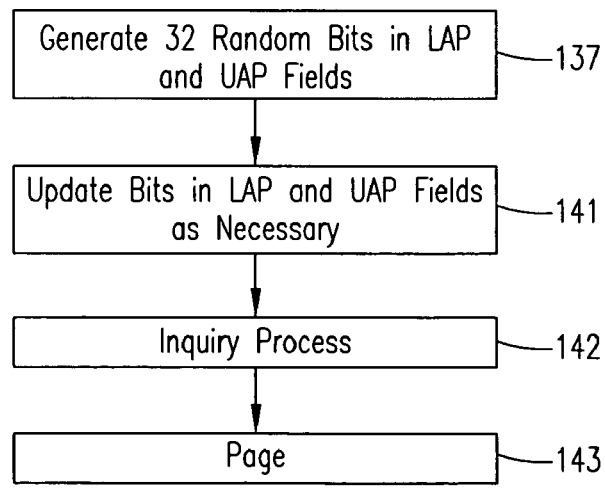
FIG. 9 is a flow diagram illustrating one method for generating the random Bluetooth address of FIG. 8.

Referring now to FIGS. 8 and 9, there is illustrated one embodiment of a method for generating the random Bluetooth address referred to in FIGS. 5 and 6. This method utilizes short-lived Bluetooth addresses (BD_addr_active) which are chosen at random, but all units also include a long-lived Bluetooth address (BD_addr). The active address, BD_addr_active, includes the same NAP field 136 as the BD_addr. The BD_addr_active address is obtained by generating 32 random bits at step 137 when a Bluetooth module is powered up. The 32 random bits may be generated according to any method. These 32 random bits determine the LAP 138 and UAP 139 fields within the BD_addr_active address. The LAP 138 and UAP 139 fields are also periodically updated at step 141 to reselect the 32 random bits.

Once a random BD_addr_active address has been generated, the Inquiry process will proceed in the same fashion as currently designed within the Bluetooth specification at step 142 except that the address used within an FHS (Frequency-hopping sequence) packet will comprise the BD_addr_active address. A first FHS packet will contain the BD_addr_active address of the master. Subsequent FHS packets may contain the BD_addr of the master transmitted in the clear or may alternatively transmit the BD_addr of the master in an encrypted format with a certain anonymity unit key belonging to the slave. The paging procedure within the Bluetooth communications protocol will proceed according to the currently defined Bluetooth specification at step 143 except that the access code (CAC and DAC), as well as the frequency-hopping scheme, are based upon the BD_addr_active addresses.

After an inquiry and page have been done between a master and slave units using the BD_addr_active addresses, the master unit does not know the BD addr of the slave and vice versa. Once a connection has been established, the master and slave units may perform a security pairing procedure to enable an encrypted connection to be established between the two units so that the BD_addr addresses for each unit may be exchanged.

Figure 10A:
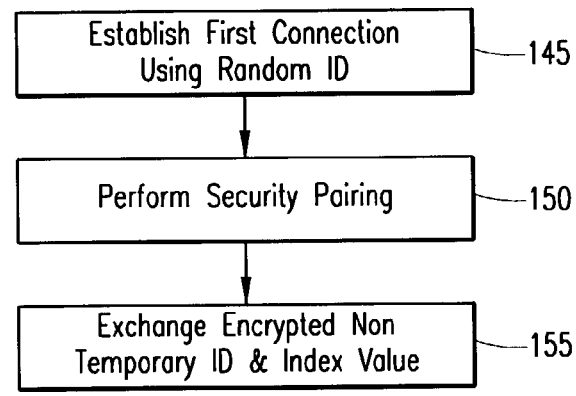
FIGS. 10A and 10B illustrate yet a further embodiment of a method for communicating anonymously between Bluetooth devices.
Figure 10B:
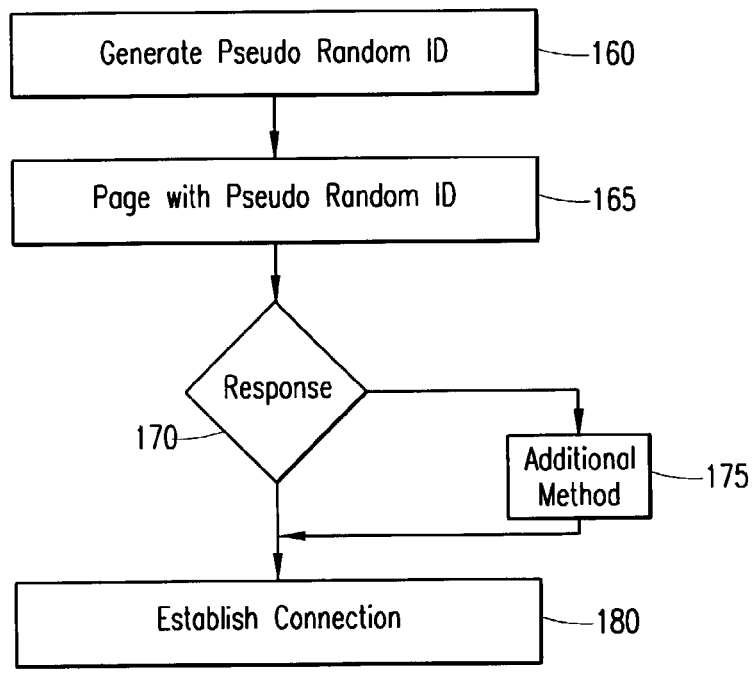

Referring now to FIGS. 10A and 10B, there is illustrated a further embodiment wherein a connection is established at step 145 using a random identification number from the first Bluetooth device 10. Once a connection between a first Bluetooth device 10 and a second Bluetooth device 15 is established using the random identification number, a security pairing may be performed between the two devices at step 150. As a result of the security pairing, the Bluetooth devices exchange at step 155 encrypted, non-temporary Bluetooth identification numbers and an index value. Each Bluetooth unit has its own separate index value.

Later when the first and second Bluetooth devices wish to contact each other, a pseudo-random identification number is generated at step 160 by the contacting Bluetooth device using the non-temporary identification number and the index value. The contacting Bluetooth device pages at step 165 the other Bluetooth device using the generated pseudo-random identification number. The contacting Bluetooth device monitors for a response to the page at step 170. Upon receipt of a response to the page, a connection is established at step 180 between the Bluetooth devices. If no response is received, a connection may be established using another method at step 175, for example, the method described in FIG. 5.

Figure 11:
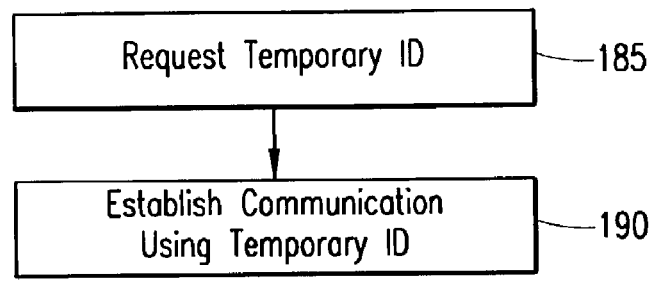
FIG. 11 illustrates yet a further embodiment of a method for communicating anonymously between Bluetooth devices.

Referring now to FIG. 11, there is illustrated an alternative embodiment wherein upon entry into communication of a first Bluetooth device 10 with a second Bluetooth device 15, the first Bluetooth device 10 requests at 185 a temporary identification number from the second Bluetooth device 15. Upon receipt of the temporary identification number from the second Bluetooth device 15, the first Bluetooth device 10 establishes communication with the second Bluetooth device 15 at step 190 using the provided temporary identification number.

Figure 12:
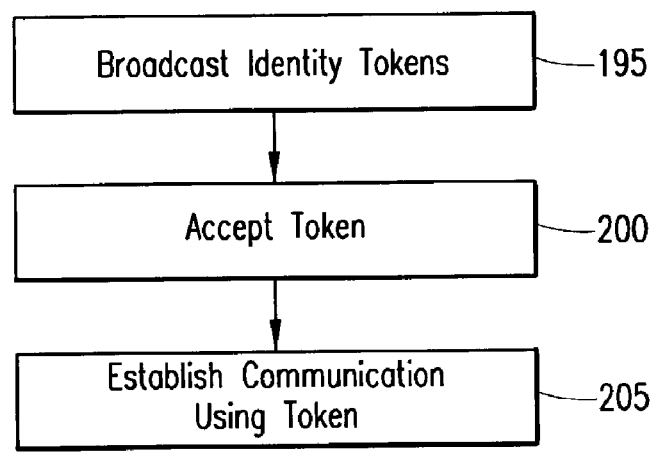
FIG. 12 illustrates yet a further embodiment of a method for communicating anonymously between Bluetooth devices.

In the embodiment illustrated in FIG. 12, at least one Bluetooth device within the system broadcasts identity tokens at step 195. When a Bluetooth device desires to establish communication with another Bluetooth device, the device accepts an identity token at step 200 and establishes communications using the identity token at 205.

Figure 13:
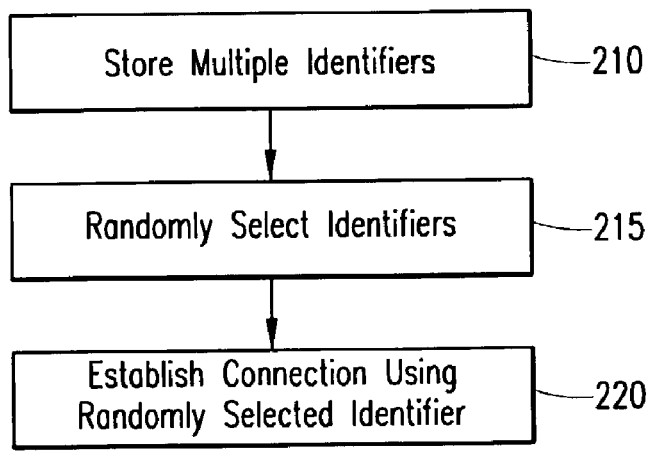
FIG. 13 illustrates yet a further embodiment of a method for communicating anonymously between Bluetooth devices.

Referring now to FIG. 13, there is illustrated yet another embodiment wherein a Bluetooth device 10 stores at step 210 multiple temporary identification numbers within, for example, the storage area 20 described in FIG. 1. Upon the need to establish a connection with a separate Bluetooth device 15, one of the multiple identification numbers is randomly selected at step 215. A connection may then be established at step 220 using the randomly selected identification number.

Figure 14:
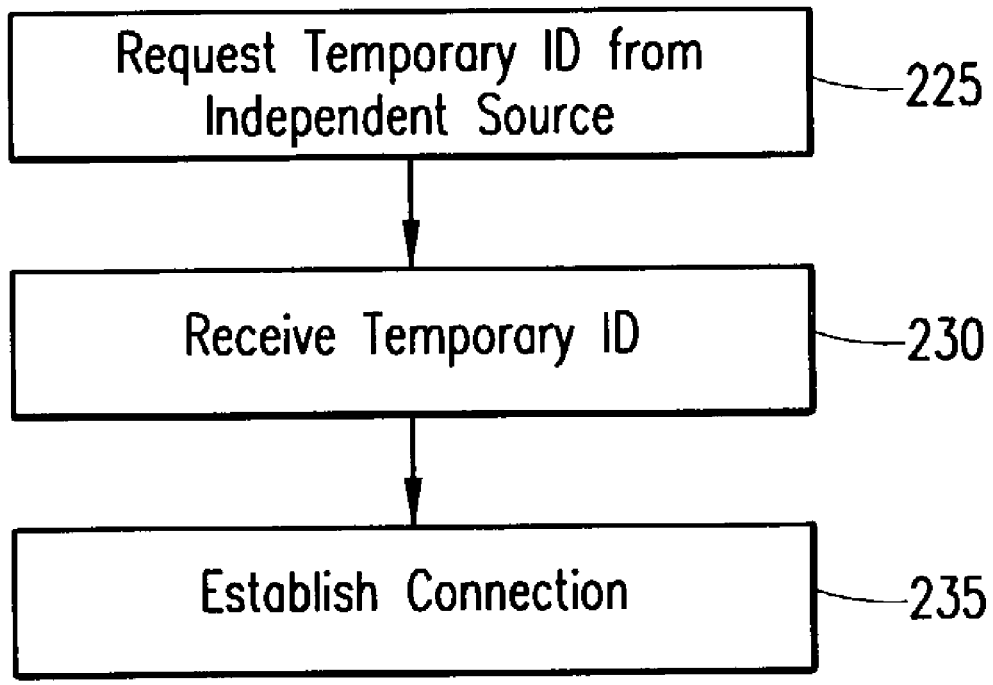
FIG. 14 illustrates yet a further embodiment of a method for communicating anonymously between Bluetooth devices.

Referring now to FIG. 14, there is illustrated yet another embodiment wherein a Bluetooth device requests a temporary identification number from an independent source at step 225. The requesting Bluetooth device receives at step 230 a temporary identification number from the independent source via, for example, a public wireless network or a Bluetooth connection. The Bluetooth device 10 may then establish a connection at step 235 using the provided temporary identification number. Independent sources from which the Bluetooth device might receive the temporary identification number include, for example, network server, wireless network server, Internet server, etc.

Figure 15:
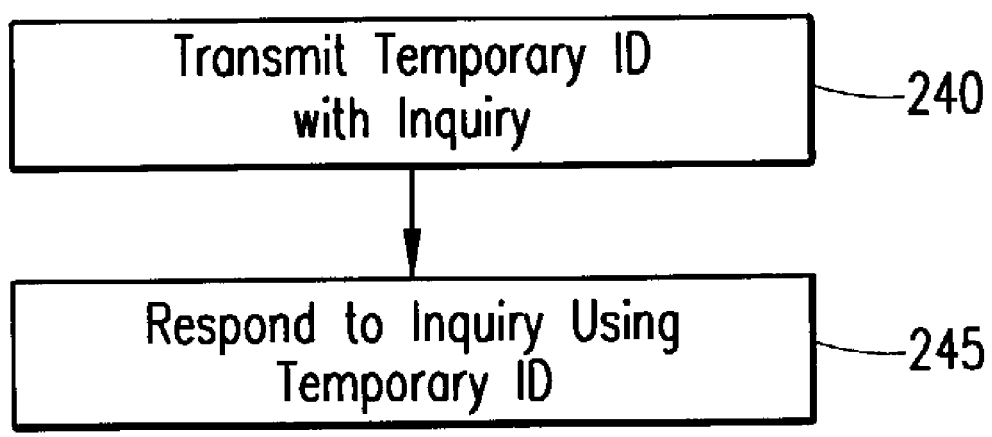
FIG. 15 illustrates yet a further embodiment of a method for communicating anonymously between Bluetooth devices.

Referring now finally to FIG. 15, there is illustrated yet a further embodiment wherein inquiries and communications transmitted from a first Bluetooth device 10 to a second Bluetooth device 240 include a temporary identification number with the inquiry or communication. The contacted Bluetooth device 15 responds to the inquiry using the provided temporary identification number at step 245 without going through the process of generating or obtaining another temporary identification number.

Utilizing the above described embodiments, a Bluetooth device is able to act as an anonymous entity enabling communications with other Bluetooth device without readily providing the identity of the communicating device or the user associated with the Bluetooth device. Any user identification may be done in a secure fashion on the application level independently of the Bluetooth identity.

Thus, unauthorized individuals may not inappropriately determine who is using a particular Bluetooth device.

The previous description is of a preferred embodiment for implementing the invention, and the scope of the invention should not necessarily be limited by this description. The scope of the present invention is instead defined by the following claims.

What is claimed is:

1. A method of communicating from a first wireless network device to a second wireless network device using a wireless network communications protocol without revealing an identity of the first wireless network device to a third party, comprising the steps of:
    generating a random identification number at the first wireless network device;
    using the random identification number to request a temporary identification number for the first wireless network device from a source located remotely from the first wireless network device;
    receiving the temporary identification number from the remote source responsive to the request; and
    transmitting information from the first wireless network device to the second wireless network device utilizing the temporary identification number instead of the identity of the first wireless network device, wherein the step of generating a random identification number comprises the step of randomly generating a portion of bits comprising a wireless network device address.

2. The method of claim 1, further including the step of periodically regenerating the portion of the bits comprising the wireless network device address.

3. The method of claim 1, wherein the step of generating a random identification number comprises the step of randomly generating 32 bits of the 48 bits of the wireless network device addresses.

4. The method of claim 1, wherein the step of generating a random identification number comprises the step of randomly generating lower address part (LAP) and upper address part (UAP) fields of a wireless network device address.

5. The method of claim 1, wherein the remote source is a device that is not operating according to the wireless network communication protocol.

6. The method of claim 1, wherein the remote source is a device operating according to the wireless network communications protocol.

7. The method of claim 1, wherein the step of randomly generating includes:
    storing multiple temporary identification numbers within the first wireless network device; and
    randomly selecting one of the multiple temporary identification numbers as the random identification number for the first wireless network device.

* * * * *